US012792141B2

(12) United States Patent
Leiby et al.

(10) Patent No.: US 12,792,141 B2
(45) Date of Patent: Nov. 10, 2026

(54) GAZE DEPENDENT DEPTH REPROJECTION IN A HEAD-MOUNTED DISPLAY

(71) Applicant: Valve Corporation, Bellevue, WA (US)

(72) Inventors: Aaron Leiby, Seattle, WA (US); Evan Fletcher, Carnation, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 19/088,152

(22) Filed: Mar. 24, 2025

(65) Prior Publication Data

US 2026/0288233 A1 Sep. 24, 2026

(51) Int. Cl.
*G06F 3/01* (2006.01)
*G09G 3/00* (2006.01)

(52) U.S. Cl.
CPC .............. *G06F 3/013* (2013.01); *G06F 3/012* (2013.01); *G09G 3/001* (2013.01); *G09G 2340/0435* (2013.01); *G09G 2354/00* (2013.01)

(58) Field of Classification Search
CPC ......... G06F 3/013; G06F 3/012; G09G 3/001; G09G 2340/0435; G09G 2354/00
See application file for complete search history.

(56) References Cited

U.S. PATENT DOCUMENTS 4,836,670 A * 6/1989 Hutchinson ............ A61B 3/113 396/51
5,481,622 A * 1/1996 Gerhardt ................ A61B 3/113 345/158
6,163,336 A * 12/2000 Richards .............. H04N 13/371 348/E13.058
9,116,666 B2 * 8/2015 Salter ....................... G06F 3/017
12,014,472 B1 * 6/2024 Mirhosseini .............. G06T 3/18
12,254,131 B1 * 3/2025 Strandborg ............. G06F 3/012
12,423,916 B1 * 9/2025 Sztuk ..................... G06T 17/205
2006/0028400 A1 * 2/2006 Lapstun ............. G02B 27/0093 345/8
2015/0002542 A1 * 1/2015 Chan ......................... G06T 3/02 345/633
2015/0029218 A1 * 1/2015 Williams ........... G02B 27/0172 345/633
2016/0067617 A1 * 3/2016 Tolk ...................... A63F 13/428 463/31
2017/0155885 A1 * 6/2017 Selstad ...................... G06T 7/20
(Continued)

*Primary Examiner* — Benyam Ketema
(74) *Attorney, Agent, or Firm* — Lee & Hayes, P.C.

(57) ABSTRACT

Described herein are gaze dependent depth reprojection techniques for a head-mounted display (HMD) to mitigate judder in a region of an image where the user is focusing their gaze. In an example process, a HMD system receives, from an application, pixel data for a frame, and determines, based on eye tracking data generated by an eye tracking system, a gaze point where a user wearing a HMD will be looking at a time at which an image will be presented on a display panel(s) of the HMD based on the pixel data. The HMD system determines, based on the gaze point, a depth parameter value for reprojection, applies reprojection adjustments to the pixel data based on the depth parameter value to obtain modified pixel data associated with a reprojected frame, and presents the image on the display panel(s) of the HMD based on the modified pixel data.

20 Claims, 6 Drawing Sheets

(56) References Cited

U.S. PATENT DOCUMENTS

| | | | | |
|---|---|---|---|---|
| 2017/0372457 | A1* | 12/2017 | Sylvan | G06F 1/163 |
| 2017/0374341 | A1* | 12/2017 | Michail | G06T 19/00 |
| 2018/0059780 | A1* | 3/2018 | Mitchell | A63F 13/21 |
| 2018/0061116 | A1* | 3/2018 | Mitchell | G06F 3/011 |
| 2018/0260120 | A1* | 9/2018 | Ozguner | G06F 3/061 |
| 2018/0286105 | A1* | 10/2018 | Surti | G06T 15/10 |
| 2020/0020157 | A1* | 1/2020 | Powers | G06T 19/006 |
| 2020/0043122 | A1* | 2/2020 | Xiao | G06T 15/80 |
| 2020/0111195 | A1* | 4/2020 | Vlachos | G06F 3/013 |
| 2020/0348750 | A1* | 11/2020 | Selan | H04N 13/398 |
| 2021/0201580 | A1* | 7/2021 | Sztuk | G06T 5/70 |
| 2021/0258555 | A1* | 8/2021 | Leiby | H04N 13/279 |
| 2021/0374918 | A1* | 12/2021 | Margolis | G09G 3/003 |
| 2022/0404578 | A1* | 12/2022 | Lee | H04N 23/671 |
| 2023/0037329 | A1* | 2/2023 | Erkelens | G06F 3/011 |
| 2023/0308631 | A1* | 9/2023 | Price | G06F 3/011 |
| 2025/0298466 | A1* | 9/2025 | Xiong | G06T 15/205 |
| 2025/0321636 | A1* | 10/2025 | Yoo | G06T 7/521 |
| 2025/0377760 | A1* | 12/2025 | Mckenzie | G06F 3/013 |

* cited by examiner

GAZE DEPENDENT DEPTH REPROJECTION IN A HEAD-MOUNTED DISPLAY

BACKGROUND

Virtual reality (VR) systems are used both within and outside of the video game industry. Displays for VR systems, such as those embedded in a VR headset, typically operate at a minimum refresh rate that is suitable for VR applications. For instance, 90 Hertz (Hz) is a common refresh rate for VR displays. In a "live rendering" scenario, a graphics-based application uses pose predictions of the VR headset in real-time to output frames for rendering at a frame rate that matches the refresh rate of the display. In this scenario, a new frame output by the application can be displayed at every screen refresh. Such a live rendering scenario is often referred to as the application "hitting frame rate."

In practice, an application does not always hit frame rate for various reasons. For example, the application may intermittently drop a frame, and/or the application may temporarily output frames at a slower rate (e.g., 45 frames per second when the ideal frame rate is 90 frames per second). In a distributed system, network congestion may introduce latency, making it even more difficult to hit frame rate. "Reprojection" is a technique used to compensate for slight inaccuracies in an original pose prediction of the VR headset and/or to compensate for the application failing to hit frame rate. For example, a reprojected frame can be generated using pixel data from an application-rendered frame by transforming (e.g., through rotation and/or translation calculations) the pixel data in a way that accounts for an updated pose prediction of the VR headset. Accordingly, the reprojected frame can be used to present an image on the display panel(s) of the VR headset, and this process may iterate over a series of frames. In a scenario where the application fails to hit frame rate and an application-rendered frame is "missing" for an upcoming screen refresh, a reprojected frame can be generated using pixel data from the most recent application-rendered frame, making it appear to the user as if there are no missing application-rendered frames.

Without reprojection, a deficient frame rate from the application, or a late arrival of an application-rendered frame at the VR headset, may cause in-game stuttering or hitching. In VR applications, where the user is fully immersed in the virtual environment, the user can become nauseous if frames are missed and there is no reprojection to compensate for the missing frames. Thus, reprojection is a technique that allows for a better user experience when frames are missed. Consider an example where the application is outputting frames at half the ideal frame rate (e.g., 45 frames per second where 90 frames per second is the ideal frame rate). In this example, every other frame can be reprojected using pixel data from the previous application-rendered frame to create a reprojected frame that transforms the scene (e.g., through rotation and/or translation calculations) in accordance with the user's current head pose. This makes it look to the user as if the scene is moving in a way that is expected given the user's head movement, even when reprojected frames are used to compensate for missing applicant-rendered frames.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
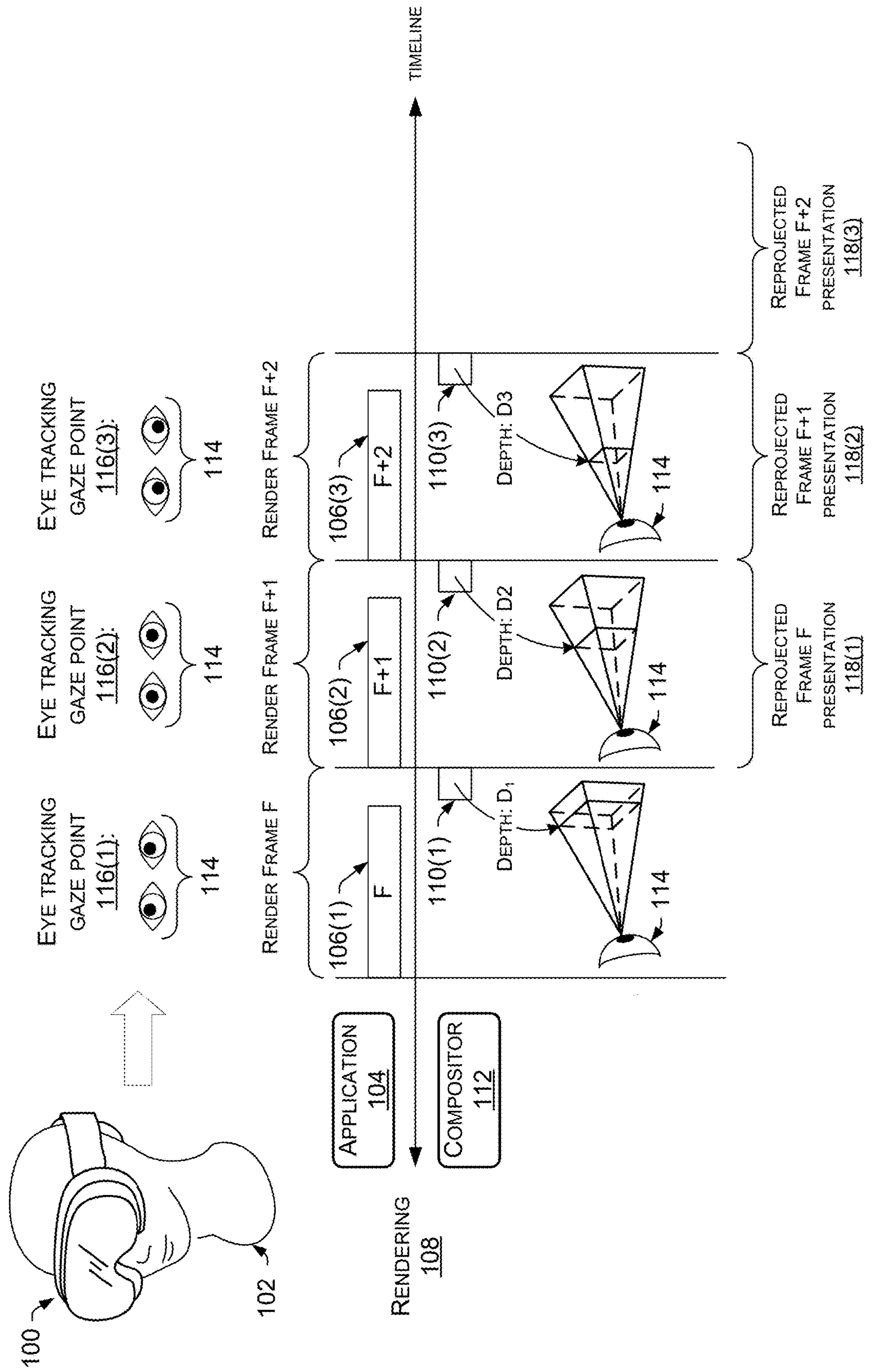
FIG. 1 is a diagram illustrating an example technique for implementing gaze dependent depth reprojection, in accordance with embodiments disclosed herein.

Although reprojection prevents in-game stuttering or hitching, it can produce its own unwanted visual artifacts during head movement. For example, although reprojection accounts for head movement, conventional VR systems reproject frames at a fixed depth. However, this fixed depth does not account for where the user is looking in the virtual scene in terms of the depth of focus of the user's gaze. Consider an example where frames are being reprojected at a fixed depth corresponding to a far plane in the background of the virtual scene. In this example, if the user is focusing their gaze on a virtual object(s) in the foreground of the virtual scene (e.g., their virtual hands) an unwanted visual artifact called "judder" can occur with respect to the virtual object(s) the user is looking at. Judder causes the user to perceive a "double ghosting effect" where a virtual object(s) appears to bounce between two locations (or separate from itself) frame-to-frame. Judder, in this scenario, is exacerbated when the application fails to hit frame rate because there is more guesswork involved in generating a reprojected frame in that scenario. Accordingly, if reprojection is being used to generate reprojected frames at a fixed depth, if the user is focusing on a virtual object(s) that is at a depth in the virtual scene different than the fixed depth, and if the user moves their head while focusing on the virtual object(s), the virtual object(s) the user is looking at will judder, and this judder becomes more noticeable as the user's gaze point moves farther away from the fixed depth used for reprojection.

Described herein are, among other things, techniques, devices, and systems for gaze dependent depth reprojection. To illustrate, a HMD may be worn by a user (e.g., for purposes of immersing the user in a VR environment). One or more display panels of the HMD present images based on a series of frames that are output by an application (e.g., a video game), and these images are viewed by a user through the optics that are included in the HMD. In an example, the application may generate pixel data for the series of frames, and the pixel data can be used to present corresponding images on the display panel(s) of the HMD. In a VR system, this makes the user perceive the images as if the user was immersed in a VR environment.

An eye tracking system may be configured to track the user's eyes while the user is wearing the HMD. For example, the eye tracking system may include one or more cameras disposed in a housing of the HMD and facing the user's eyes to determine a gaze point associated with the user. The techniques disclosed herein use the gaze point to dynamically adjust the depth associated with reprojected frames. For example, a system, including the HMD, may utilize reprojection to compensate for slight inaccuracies in an original pose prediction of the HMD and/or to compensate for the application failing to hit frame rate. For example, a reprojected frame can be generated using pixel data from an application-rendered frame by transforming (e.g., through rotation and/or translation calculations) the application-rendered frame in a way that accounts for an updated prediction of the pose of the HMD. Dynamically adjusting the depth associated with reprojected frames, in real-time, based on the user's gaze point mitigates unwanted, reprojection-based visual artifacts (e.g., judder) in a "region of interest" where the user is looking. Accordingly, the techniques, devices, and systems described herein improve the image quality in the region of interest where the user is looking by virtue of mitigating judder in the region of interest. This can, for example, make virtual objects less distracting to focus on because they appear as stable, singular objects over a series of re-projected frames, instead of appearing as multiple vibrating points. If, for example, text (e.g., words, numbers, symbols, etc.) is presented in the rendered image, the techniques, devices, and systems described herein make the text more legible in the region of interest where the user is looking.

In an example process, a HMD system, or a component thereof (e.g., a compositor), may receive, from an application, pixel data for a frame. The HMD system may determine, based at least in part on eye tracking data generated by an eye tracking system, a gaze point where a user wearing a HMD will be looking at a time at which an image will be presented on a display panel(s) of the HMD based at least in part on the pixel data. In some examples, this determination of the gaze point is referred to as a "prediction" of the gaze point because it is made in advance of the presentation of the image. The HMD system may determine, based at least in part on the gaze point, a depth parameter value for reprojection. For example, as described in detail below, reprojection can be performed at various depths in three-dimensional (3D) space, the various depths ranging from a near plane to a far plane with respect to the user's eyes. Accordingly, the HMD system can apply reprojection adjustments to the pixel data based at least in part on the depth parameter value, which allows reprojection to be performed at the same, or similar, depth of focus of the user's gaze. Modified pixel data associated with a reprojected frame is obtained from applying the reprojection adjustments and is used to present the image on the display panel(s) of the HMD. For example, the modified pixel data can be output to a framebuffer for presenting the image (corresponding to the reprojected frame) on the display panel(s).

By using the gaze point of the user to dynamically adjust the depth associated with reprojected frames, the scene (or picture) can be rendered without judder in the region of interest where the user is looking during image presentation. In other words, if, by tracking the user's eyes, it can be determined that the user is likely to look at a virtual object(s) in the foreground of the virtual scene, the HMD system can apply reprojection adjustments to the pixel data of an application-rendered frame at a two-dimensional (2D) plane that corresponds to the depth of the virtual object(s) in the foreground, thereby mitigating unwanted visual artifacts (e.g., judder) caused by reprojection in a region of interest on the display(s) where a user is looking. This, in turn, improves the display performance by preventing these unwanted visual artifacts from manifesting in the region of interest. Thus, instead of always reprojecting frames at a fixed depth, the techniques described herein are directed to dynamically determining a depth parameter value based on the user's gaze point during image presentation, and using the depth parameter value for reprojecting the next frame. Said another way, for each frame, the HMD system is configured apply reprojection adjustments to the frame at a depth that is determined based on a prediction of where the user will be looking (in a depth sense) when the corresponding image is presented.

Also disclosed herein are systems and devices configured to implement the techniques and processes disclosed herein, as well as non-transitory computer-readable media storing computer-executable instructions to implement the techniques and processes disclosed herein. Although the techniques, devices, and systems disclosed herein are discussed, by way of example, in the context of video game applications, and specifically VR gaming applications, it is to be appreciated that the techniques and systems described herein may provide benefits with other applications, including, without limitation, non-VR applications (e.g., augmented reality (AR) applications, mixed reality (MR) applications, etc.), and/or non-gaming applications, such as industrial machine applications, defense applications, robotics applications, a 3D viewer application, any 3D application that uses stereo rendering, and the like. Additionally, although the techniques, devices, and systems disclosed herein are discussed, by way of example, in the context of a HMD (e.g., a VR headset), it is to be appreciated that the techniques described herein may be implemented with respect to other displays that are not "head mounted." For example, the techniques described herein may be implemented in association with a 3D display and a system that tracks motion of a viewing user's head using a tracking system (e.g., a tracking system including a camera(s), infrared light emitting diodes (LEDs), etc.).

FIG. 1 is a diagram illustrating an example technique for implementing gaze dependent depth reprojection, in accordance with embodiments disclosed herein. FIG. 1 depicts a head-mounted display (HMD) 100 worn by a user 102. The HMD 100 in the example of FIG. 1 may include a single display panel or multiple display panels (e.g., See FIG. 6), such as a left display panel and a right display panel of a stereo pair of display panels. The one or more display panels of the HMD 100 may be used to present a series of image frames (herein referred to as "frames") that are viewable by a user 102 wearing the HMD 100. It is to be appreciated that the HMD 100 may include any number of display panels (e.g., more than two display panels, a pair of display panels, or a single display panel). Hence, the terms "display panel," as used in the singular herein, may refer to either display panel of a pair of display panels of a two-panel HMD 100, or it may refer to a single display panel of a HMD 100 with any number of display panels (e.g., a single-panel HMD 100 or a multi-panel HMD 100). In a two-panel HMD 100, a stereo framebuffer may render, for instance, 1440×3200 pixels on both display panels of the HMD 100 (e.g., 1440×1600 pixels per display panel, or per eye).

The display panel(s) of the HMD 100 may utilize any suitable type of display technology, such as an emissive display that utilizes light emitting elements (e.g., light emitting diodes (LEDs)) to emit light during presentation of frames on the display panel(s). As an example, display panels of the HMD 100 may comprise liquid crystal displays (LCDs), organic light emitting diode (OLED) displays, inorganic light emitting diode (ILED) displays, or any other suitable type of display technology for HMD applications.

The display panel(s) of the HMD 100 may operate at any suitable refresh rate, such as a 90 Herz (Hz) refresh rate. The "refresh rate" of a display is the number of times per second the display can redraw the screen. The number of frames displayed per second may be limited by the refresh rate of the display. Thus, a series of frames may be processed (e.g., rendered) and displayed as images on the display such that a single frame of the series of frames is displayed with every screen refresh. That is, in order to present a series of images on the display panel(s) of the HMD 100, the display panel(s) may transition from frame-to-frame, in the series of frames, at the refresh rate of the display, illuminating the pixels at every screen refresh. In some examples, the refresh rate is a variable refresh rate that changes during use of the HMD 100. In some examples, the refresh rate is a fixed refresh rate.

As used herein, "illuminating a pixel" means illuminating the light emitting element that corresponds to that pixel. For example, a LCD illuminates a light emitting element of a backlight to illuminate the corresponding pixel(s) of the display. The HMD 100 may include, among other things, a display controller(s), display driver circuitry, and similar electronics for driving the display panel(s). Display driver circuitry may be coupled to an array of light emitting elements of the display panel(s) via conductive paths, such as metal traces, on a flexible printed circuit. In an example, a display controller(s) may be communicatively coupled to the display driver circuitry and configured to provide signals, information, and/or data to the display driver circuitry. The signals, information, and/or data received by the display driver circuitry may cause the display driver circuitry to illuminate the light emitting elements in a particular way. That is, the display controller(s) may determine when the element(s) is/are to illuminate and the level of light output that is to be emitted by the light emitting element(s), and may communicate the appropriate signals, information, and/or data to the display driver circuitry in order to accomplish that objective.

Pixel data for a given frame can be output to a framebuffer (e.g., a stereo framebuffer) for presenting the frame as an image on the display panel(s) of the HMD 100 with a desired visual effect. Pixel data for each frame may, in some embodiments, include a 2D array of per-pixel values. In some embodiments, pixel data can be output by the application and/or to a framebuffer in UV coordinates that start at 0,0 in the upper left corner of a texture and go to 1,1 in the lower right corner. In UV coordinates, u is the horizontal coordinate (e.g., ranging from 0 to 1), and v is the vertical coordinate (e.g., ranging from 0 to 1). UV coordinates can be used in 2D texture mapping or screen space, and may represent positions on a 2D plane.

The HMD 100 may represent a VR headset for use in VR systems, such as for use with a VR gaming system. However, the HMD 100 may additionally, or alternatively, be implemented as an AR headset for use in AR applications, a MR headset for use in MR applications, or a headset that is usable for VR, AR, and/or MR applications that are not game-related (e.g., industrial applications). In AR, a user 102 sees virtual objects overlaid on a real-world environment, and in MR, the user 102 may see both virtual and real-world objects that interact in real time, whereas, in VR, the user 102 does not typically see a real-world environment, but is fully immersed in a virtual environment, as perceived via the video content displayed on the display panel(s) and perceived via the optics (e.g., lenses) of the HMD 100. It is to be appreciated that, in some VR systems, pass-through imagery of the real-world environment of the user 102 may be displayed in conjunction with virtual imagery to create an augmented VR environment in a VR system, whereby the VR environment is augmented with real-world imagery (e.g., overlaid on a virtual world). Examples described herein pertain primarily to a VR-based HMD 100, but it is to be appreciated that the HMD 100 is not limited to implementation in VR applications.

In general, a graphics-based application 104 (e.g., a video game) executing on a computing device—such as the HMD 100 itself, or a computing device (e.g., a personal computer (PC), a game console, a server, etc.) associated with, and coupled to, the HMD 100 as part of a HMD system—may be configured to output a series of frames 106(1), 106(2), 106(3), and so on (collectively 106). The series of frames 106 are ultimately presented as images on the display panel(s) of the HMD 100. The example of FIG. 1 depicts three example frames 106(1) (or frame "F"), 106(2) (or frame "F+1"), and 106(3) (or frame "F+2") with respect to a rendering timeline 108 to illustrate how the frames 106 can be rendered in series. Here, the application 104 renders frame F first, then frame F+1, and then frame F+2, in sequence, from left to right on the rendering timeline 108. The rendering timeline 108 also shows the rendering workloads 110 of a compositor 112 of the HMD 100 (or HMD system) towards the end of each rendering interval for each frame 106. An individual rendering workload 110 of the compositor 112 for a given frame 106 may represent adjustments that are applied to the pixel data output by the application 104 before rendering a final image on the HMD 100. Such adjustments may include, without limitation, adjustments for chromatic distortion, panel masking, reprojection, and/or the like, which are applied to the frame 106 output by the application 104 before rendering a final image on the HMD 100. Accordingly, the frames 106 that are shown in FIG. 1 are meant to represent application-rendered frames in the sense that they are output from the application 104, which may represent a video game application, or any other type of graphics-based application. The application 104 may be executed in a graphics pipeline that outputs pixel data, and the compositor 112 is configured to modify that pixel data, and to output the modified pixel data to a framebuffer (e.g., a stereo framebuffer).

During runtime, an eye tracking system (e.g., See FIG. 6) of the HMD 100 (or HMD system) may generate eye tracking data indicative of a gaze point where the user 102 is looking at any given moment in time. The eye tracking system may include a camera(s) or other optical sensor(s) in a housing of the HMD 100, facing the user's eyes 114, and configured to capture image data associated with a user's eyes 114. The captured image data can be used to determine motion vectors, interpupillary distance, interocular distance, a 3D position of each eye 114 relative to the HMD 100, including a magnitude of torsion and rotation (e.g., roll, pitch, and yaw) and/or a gaze point in 3D space (e.g., a specific point in 3D space where the user's eyes 114 are focused). The depth of the gaze point in 3D space can be calculated using any suitable algorithm, such as a binocular visual depth detection algorithm. In one example, infrared light is emitted within the HMD 100 and reflected from each eye 114. The reflected light is received or detected by a camera(s) and/or a light detector(s) (e.g., silicon photodiode(s)) of the HMD 100 and analyzed to extract eye rotation from changes in the infrared light reflected by each eye 114. In some embodiments, the eye tracking system may integrate information from past measurements, measurements identifying a position of a user's 102 head, and 3D information describing a scene presented on the display panel(s) of the HMD 100. Thus, information for the position and orientation of the user's 102 eyes 114 can be used to determine the gaze point in a virtual scene presented by HMD 100 where the user 102 is looking. Many methods for tracking the eyes 114 of the user 102 can be employed by the eye tracking system of the HMD 100 (or HMD system), and these are merely examples of eye tracking techniques that can be employed.

The eye tracking data generated by the eye tracking system of the HMD 100 (or HMD system) can be used by the compositor 112 to determine a gaze point 116 where the user 102 will be looking at a time at which an image will be presented on the display panel(s) of the HMD 100 for the upcoming frame 106 (e.g., the image based at least in part on the pixel data output by the application 104). In some embodiments, the most recent eye tracking data (e.g., the gaze point 116) can be used as a proxy for predicting where the user 102 will be looking during image presentation for an upcoming frame 106. With today's eye tracking technology, it is difficult to accurately predict where the user's eyes 114 will be at a future time because of the ballistic motions that can be exhibited by the eyes during rapid eye movement. This is one reason for using the most recent gaze point estimation as a proxy for predicting a future gaze point. However, as eye tracking improves over time, the prediction of where the user 102 will be looking at a future time may become more accurate, and, hence, a prediction of a future gaze point may be determined as a function of past eye tracking data. For instance, a future gaze point can be predicted based on motion vector estimations of the user's eyes 114, and/or based on additional data.

In addition to the eye tracking system, a head tracking system (e.g., See FIG. 6) of the HMD 100 (or HMD system) may generate head tracking data about the pose of the HMD 100, and the compositor 112 is configured to determine a pose that the HMD 100 will be in at the time at which an image will be presented on the display panel(s) of the HMD 100 for the upcoming frame 106 (e.g., the image based at least in part on the pixel data output by the application 104). Thus, for frame F, the compositor 112 may predict a pose that the HMD 100 will be in at the time of image presentation for frame F, and the compositor 112 may send pose data indicative of the predicted pose to the application 104 for rendering frame F. Providing the pose data to the application 104 in advance allows the application 104 to output pixel data for rendering imagery on the HMD 100 in a way that is correct for the user's 102 predicted head pose at the future time. This means that the application 104 renders a scene that is appropriate for the user's predicted head pose at a future time when light from the display panel(s) of the HMD 100 reaches the user's eye(s) 114.

The graphics logic of the HMD 100 (or HMD system) may be asynchronous, or synchronous. In an asynchronous system, the compositor 112 runs separate (on a separate, asynchronous thread) from the application 104 on a graphics processing unit (GPU) of the HMD 100 (or HMD system). For instance, the application 104 may call a function to receive pose data from the compositor 112, and the compositor 112 may provide the application 104 with the requested pose data (predicted to the time of image presentation for frame F) so that the application 104 can render the frame 106 (e.g., frame F) according to the pose data, which corresponds to a virtual camera pose used to render the scene. Assuming the application 104 finishes rendering the frame 106 before the compositor's workload 110 starts, the compositor 112 is configured to take the frame 106 (e.g., left and right image frames) from the application 104 and distort the frame(s) 106 into the back buffer(s) onto the display panel(s) of the HMD 100. For example, the compositor 112 may perform, without limitation, chromatic distortion, panel masking, reprojection, and/or the like, before presenting a final image on the HMD 100 based on the frame 106 output by the application 104.

The compositor 112 may execute in a high-priority context mode, which means that when it is time for the compositor 112 to start its workload 110, the GPU driver allows the compositor 112 to preempt the application 104 (e.g., by interrupting the application 104 from rendering, if it is still rendering a frame 106, and/or preventing the application 104 from starting to render a next frame 106). The compositor 112 may allocate a time slot (up to 1 millisecond (ms) on average) at the end of each rendering interval to do its work 110, regardless of what is happening with the application 104. Thus, at every rendering interval, the compositor 112 renders "something" in the sense that the compositor 112 obtains the best frame 106 it can obtain from the application 104 (e.g., either a fresh/new frame 106, or a previously-rendered frame 106), and the compositor 112 modifies the pixel data associated with that frame 106 to put modified pixel data in the framebuffer for output on the display panel(s) of the HMD 100. The compositor's 114 ability to output different pixel data for each screen refresh, no matter what, is the mechanism that keeps everything "live" and keeps the images rendered on the HMD 100 from hitching badly when the application 104 is not making frame rate.

In the example of FIG. 1, the compositor 112 receives, from the application 104, pixel data for frame F. The assumption here is that the application 104 is hitting frame rate. The compositor 112, during workload 110(1), may determine, based at least in part on eye tracking data generated by an eye tracking system, a gaze point 116(1) where the user 102 wearing the HMD 100 will be looking at a time at which an image will be presented on the display panel(s) of the HMD 100 based at least in part on the pixel data for frame F. In FIG. 1, reprojected frame F presentation 118(1) represents a time interval during which the image for frame F will be presented on the display panel(s) of the HMD 100. Accordingly, the gaze point 116(1) for frame F is determined (or predicted) for a time during this time interval. The compositor 112, also during workload 110(1), may determine, based at least in part on the gaze point 116(1), a depth parameter value for reprojection. This is shown conceptually in FIG. 1 as depth, $D_1$. For example, reprojection can be performed at various depths in 3D space, the various depths ranging from a near plane to a far plane with respect to the user's eyes 114. Accordingly, the depth parameter value, $D_1$, can be determined based on the predicted gaze point 116(1) so that the compositor 112 can apply, during workload 110(1), reprojection adjustments to the pixel data based at least in part on the depth parameter value, $D_1$, which allows reprojection to be performed at the same, or similar, depth of focus of the user's gaze point 116(1). Modified pixel data associated with a reprojected frame F is obtained from applying the reprojection adjustments during workload 110(1) and is used to present the image on the display panel(s) of the HMD 100 during the time interval labeled reprojected frame F presentation 118(1) in FIG. 1. For example, the modified pixel data for reprojected frame F can be output to a framebuffer for presenting the image (corresponding to the reprojected frame F) on the display panel(s) of the HMD 100. In some examples, the modified pixel data for reprojected frame F is scanned out to the display panel(s) of the HMD 100 via a display port (e.g., a high-definition multimedia interface (HDMI)) and the light emitting elements of the display panel(s) are illuminated to cause the pixels to illuminate for presenting the image.

After frame F is rendered, gaze dependent depth reprojection may iterate for each frame in the series of frames 106, as they are rendered. For example, for frame F+1, the eye tracking data may indicate a gaze point 116(2) where the user 102 will be looking at a time at which an image will be presented on the display panel(s) of the IM D 100 based at least in part on the pixel data for frame F+1 (during the time interval labeled reprojected frame F+1 presentation 118(2)). Accordingly, during workload 110(2), the compositor 112 may determine a depth parameter value, $D_2$, for reprojection based at least in part on the gaze point 116(2), and may apply reprojection adjustments to the pixel data based at least in part on the depth parameter value, $D_2$, which allows reprojection to be performed at the same, or similar, depth of focus of the user's gaze point 116(2). Modified pixel data associated with a reprojected frame F+1 is obtained from applying the reprojection adjustments during workload 110 (2) and is used to present the image on the display panel(s) of the HMD 100 during the time interval labeled reprojected frame F+1 presentation 118(2) in FIG. 1. For example, the modified pixel data for reprojected frame F+1 can be output to a framebuffer for presenting the image (corresponding to the reprojected frame F+1) on the display panel(s) of the HMD 100. In some examples, the modified pixel data for reprojected frame F+1 is scanned out to the display panel(s) of the HMD 100 via a display port (e.g., a HDMI) and the light emitting elements of the display panel(s) are illuminated to cause the pixels to illuminate for presenting the image.

Likewise, after frame F+1 is rendered, gaze dependent depth reprojection may iterate for frame F+2. For example, the eye tracking data may indicate a gaze point 116(3) where the user 102 will be looking at a time at which an image will be presented on the display panel(s) of the HM D 100 based at least in part on the pixel data for frame F+2 (during the time interval labeled reprojected frame F+2 presentation 118(3)). Accordingly, during workload 110(3), the compositor 112 may determine a depth parameter value, $D_3$, for reprojection based at least in part on the gaze point 116(3), and may apply reprojection adjustments to the pixel data based at least in part on the depth parameter value, $D_3$, which allows reprojection to be performed at the same, or similar, depth of focus of the user's gaze point 116(3). Modified pixel data associated with a reprojected frame F+2 is obtained from applying the reprojection adjustments during workload 110(3) and is used to present the image on the display panel(s) of the HMD 100 during the time interval labeled reprojected frame F+2 presentation 118(3) in FIG. 1. For example, the modified pixel data for reprojected frame F+2 can be output to a framebuffer for presenting the image (corresponding to the reprojected frame F+2) on the display panel(s) of the HMD 100. In some examples, the modified pixel data for reprojected frame F+2 is scanned out to the display panel(s) of the HMD 100 via a display port (e.g., a HDMI) and the light emitting elements of the display panel(s) are illuminated to cause the pixels to illuminate for presenting the image.

To illustrate, in the example of FIG. 1, the gaze point 116(1) may indicate that the user 102 is looking at a virtual object(s) (e.g., virtual mountains) in the virtual scene, the virtual object(s) positioned at a depth near a background, so the compositor 112 reprojects at a depth, $D_1$, which is at or near a far plane, relative the user's eyes 114. By contrast, the gaze point 116(2) may indicate that the user 102 is looking at a virtual object(s) (e.g., a non-playable character (NPC)) in the virtual scene, the virtual object(s) positioned at a depth somewhere between the foreground and the background, so the compositor 112 reprojects at a depth, $D_2$, which is at or near a mid-plane that is spaced similarly from a near plane and a far plane, relative to the user's eyes 114. Meanwhile, the gaze point 116(3) may indicate that the user 102 is looking at a virtual object(s) (e.g., their virtual hands) in the virtual scene, the virtual object(s) positioned at a depth near the foreground, so the compositor 112 reprojects at a depth, $D_3$, which is at or near a near plane, relative to the user's eyes 114. This gaze dependent depth reprojection technique may iterate for any number of frames as frames 106 continue to be output by the application 104.

Although FIG. 1 depicts a scenario where the application 104 is hitting frame rate, it is to be appreciated that gaze dependent depth reprojection may be implemented regardless of whether the application 104 is hitting frame rate or not. In fact, the benefits of the disclosed gaze dependent depth reprojection technique are even more noticeable in scenarios where the application 104 is failing to hit frame rate. In a scenario where the application 104 fails to hit frame rate, the compositor 112 may obtain pixel data for a most recent application-rendered frame 106 and may apply reprojection adjustments to that pixel data based at least in part on a depth parameter value determined from a current gaze point 116 of the user.

It is also to be appreciated that, at a frame rate of 90 Hz or a similar frame rate, the gaze points 116 of the user's eyes 114 are unlikely to change by large amounts frame-to-frame. For example, at a 90 Hz refresh rate, the time period for rendering each frame 106 (and for presenting each corresponding image of the reprojected frame) may be roughly 11 ms in duration. In this sense, the example of FIG. 1 is perhaps an unrealistic illustration that depicts the gaze point 116 changing significantly between sequential frames. Hence, the example of FIG. 1 is merely for illustrating the technique of dynamically adjusting the reprojection depth based on the gaze point 116 determined for each frame 106.

In some embodiments, the HMD 100 (or HMD system) may be configured to utilize foveated rendering and/or similar techniques to render imagery at different regions of the display panel(s) of the HMD 100 at respectively different resolutions. In this manner, since the eye tracking data can be used to predict a gaze point 116 that corresponds to a region of interest on the display panel(s) of the HMD 100 where the user 102 will be looking during image presentation, the HMD 100 (or HMD system) can render a portion of an image where the user 102 is looking at a first (high) resolution, or higher fidelity, and render a remainder of the image in the user's peripheral vision at a second (lower) resolution, or lower fidelity, that is less than the first resolution (or fidelity). This, in combination with the gaze dependent depth reprojection techniques disclosed herein, may provide improved display quality in the region of interest where the user is looking, as well as improved display performance in terms of reducing latency for scanning out pixel data because the area outside of the region of interest may have less pixel data to scan out. Furthermore, even if judder is exhibited in the portion of the image outside of the region of interest where the user 102 is looking during image presentation, the judder (and the lower resolution imagery, in some examples) is inconspicuous to the user 102 because it is in the user's peripheral vision.

It is to be appreciated that the gaze dependent depth reprojection techniques described herein may be implemented in scenarios where the application 104 provides pixel data without any depth data (e.g., a depth map) associated with the framebuffer. This can be contrasted with a scenario where the application 104 provides depth data along with the pixel data (or if the pixel data includes depth data), and where the depth data is usable for reprojection on a per-pixel basis. Accordingly, because the gaze dependent depth reprojection techniques can be used in the absence of depth data provided by the application 104, the techniques described herein are usable in a wider variety of scenarios where application-generated depth data is unavailable to the compositor 112, such as streaming scenarios where the HMD 100 wirelessly receives a color buffer from a host computer (e.g., a PC) that is executing the application 104 thereon, without the HMD 100 receiving, for example, a depth buffer from the host computer. Accordingly, while a framebuffer may include multiple images (e.g., a color buffer, a depth buffer, a motion vector buffer, etc.), the gaze dependent depth reprojection techniques described herein can be implemented exclusively with color buffers and do not rely on the availability of a depth buffer, for example.

Figure 2:
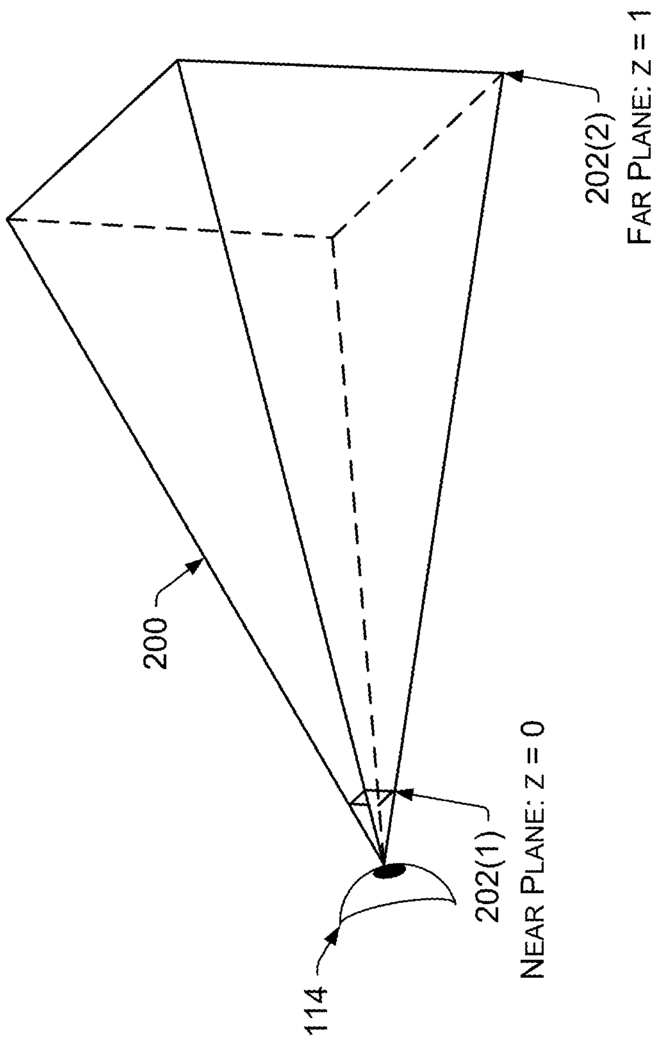
FIG. 2 is a diagram illustrating a truncated pyramid for conceptualizing depth reprojection that ranges from a near plane to a far plane, in accordance with embodiments disclosed herein.

FIG. 2 is a diagram illustrating a truncated pyramid 200 for conceptualizing depth reprojection that ranges from a near plane 202(1) to a far plane 202(2), in accordance with embodiments disclosed herein. Projection matrices used in reprojection may be defined with respect to the field of view (FOV) of the displayed content (e.g., images). This can be visualized in 3D space as a truncated pyramid 200, an example of which is depicted in FIG. 2. In some examples, normalized device coordinates (NDC) may be used to define a point location (x, y, and z normalized device coordinates) within the truncated pyramid 200. Thus, reprojection depth, in some examples, can be defined by a normalized device coordinate representing depth in 3D space, such as a z normalized device coordinate (or, a z component of a normalized device coordinate vector). With the gaze dependent depth reprojection techniques described herein, the compositor 112 may set this z normalized device coordinate to a depth parameter value that is determined based at least in part on the gaze point 116 for individual re-projected frames. One can visualize reprojection depth as reprojecting a frame 106 to a depth in the truncated pyramid 200, the depth corresponding to a 2D plane within a range of the near plane 202(1) to the far plane 202(2). Conceptually, this is as if the reprojected frame is "pasted onto" a 2D plane in the truncated pyramid 200, wherein the 2D plane represents a particular depth relative to the user's eyes 114.

In the diagram of FIG. 2, the eye 114 may be considered to be at a depth of 0 (e.g., 0 centimeters (cm) from the user's eye 114). In this example, the near plane 202(1) of the truncated pyramid 200 may represent a minimum reprojection depth (e.g., 1 cm) from the user's eye 114. The far plane 202(2) of the truncated pyramid 200 may represent a maximum reprojection depth (e.g., 1000 meters) from the user's eye 114. In some examples, the depth parameter value that is dynamically determined based at least in part on the gaze point 116 of the user 102 is within a range of 0 to 1, where a depth parameter value of 0 corresponds to the near plane 202(1) and a depth parameter value of 1 corresponds to the far plane 202(2). In examples where NDC are used to define reprojection depth, the z normalized device coordinate (or, z component of a normalized device coordinate vector) may be set to the depth parameter value, where the near plane 202(1) corresponds to z=0 and the far plane corresponds to z=1.

Figure 3:
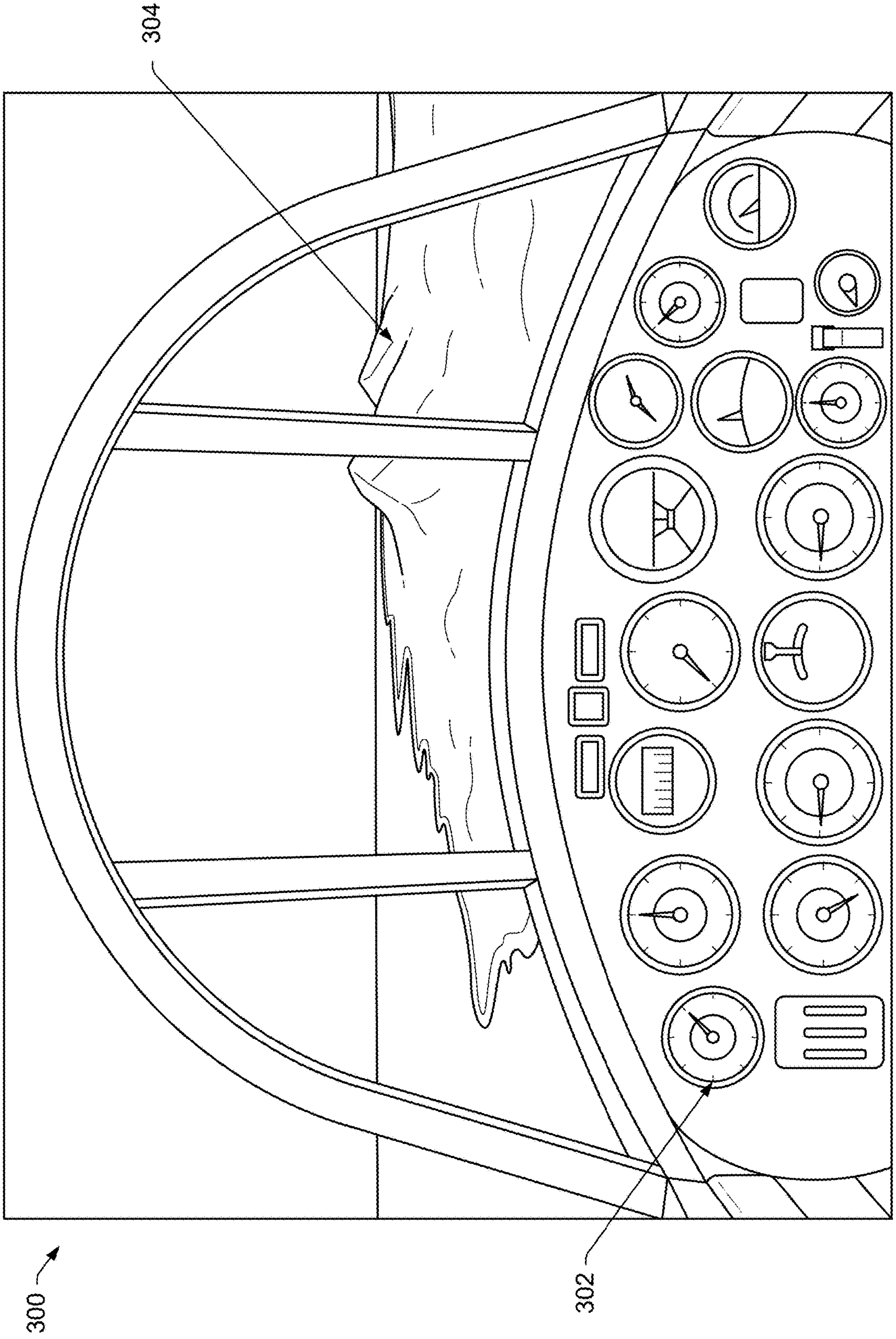
FIG. 3 is an example image presented on a display panel(s) of a head-mounted display (HMD) based at least in part on modified pixel data associated with a reprojected frame, in accordance with embodiments disclosed herein.

FIG. 3 is an example image 300 presented on a display panel(s) of a HMD 100 based at least in part on modified pixel data associated with a reprojected frame, in accordance with embodiments disclosed herein. In the example of FIG. 3, the image 300 is one of a series of images that are presented at a refresh rate (e.g., 90 Hz) of the display panel(s) of the HMD 100 in order present video content associated with an application 104. The application 104, in the example of FIG. 3, may be a VR video game. Specifically, in the example of FIG. 3, the application 104 is a flight simulator game that is played on a VR system.

Using the example of FIG. 3 to illustrate gaze dependent depth reprojection, a HMD system, or a component thereof (e.g., the compositor 112), may receive, from the application 104 (e.g., the flight simulator game), pixel data for a frame 106. The HMD system (e.g., the compositor 112) may determine, based at least in part on eye tracking data generated by an eye tracking system, a gaze point 116 where a user 102 wearing a HMD 100 will be looking at a time at which the image 300 will be presented on a display panel(s) of the HMD 100 based at least in part on the pixel data. The HMD system (e.g., the compositor 112) may determine, based at least in part on the gaze point 116, a depth parameter value for reprojection. The HMD system (e.g., the compositor 112) can apply reprojection adjustments to the pixel data based at least in part on the depth parameter value, which allows reprojection to be performed at the same, or similar, depth of focus as the user's gaze. Modified pixel data associated with a reprojected frame is obtained from applying the reprojection adjustments and is used to present the image 300 on the display panel(s) of the HMD 100.

If, in the flight simulator example of FIG. 3, the user 102 is focusing on the virtual cockpit 302 in the foreground of the virtual scene (e.g., if the user 102 is reading some text on an instrument panel in the virtual cockpit 302), and if the user 102 moves their head while gazing at the virtual cockpit 302, the portion of the image 300 in the foreground depicting the virtual cockpit 302 is stable. That is, judder is mitigated, if not eliminated, in the region of interest of the image 300 where the user 102 is looking during presentation of the image 300, which means that the text on the instrument panel in the virtual cockpit 302 does not separate from itself, and is, therefore, legible. This is because the reprojected frame corresponding to the image 300 is reprojected at a depth that corresponds to a 2D plane closer to the near plane 202(1) than the far plane 202(2) in the truncated pyramid 200 depicted in FIG. 2. Meanwhile, at the time at which the image 300 is presented, virtual objects in the background of the virtual scene (e.g., the virtual mountains 304 that are visible through the cockpit window of the plane) may judder, but the user 102 may care less about this visual artifact caused by reprojecting closer to the near plane 202(1) because the virtual mountains 304 are in the user's peripheral vision.

Alternatively, if the user 102 is looking out the cockpit window at the virtual mountains 304 in the background of the virtual scene, and if the user 102 moves their head while gazing at the virtual mountains 304, the portion of the image 300 in the background depicting the virtual mountains 304 is stable. This is because the reprojected frame corresponding to the image 300 is reprojected at a depth that corresponds to a 2D plane closer to the far plane 202(2) than the near plane 202(1) in the truncated pyramid 200 depicted in FIG. 2. Meanwhile, at the time at which the image 300 is presented, virtual objects in the foreground of the virtual scene (e.g., the virtual cockpit 302) may judder, but the user 102 may care less about this visual artifact caused by reprojecting closer to the far plane 202(2) because the virtual cockpit 302 is in the user's peripheral vision.

By contrast, without the gaze dependent depth reprojection techniques described herein, the user 102 would notice judder while focusing on the virtual cockpit 302 and moving their head if, say, frames were being reprojected at a fixed distance that is at or near the far plane 202(2) in the truncated pyramid 200 depicted in FIG. 2. This would mean that, when the user 102 is moving their head to read the text on the various instrument panels in the virtual cockpit 302, the text is illegible due to the judder in the foreground of the virtual scene. This unwanted visual artifact is exacerbated when the application 104 fails to hit frame rate, and, in these scenarios, the gaze dependent depth reprojection techniques described herein can mitigate, if not eliminate, judder so that the text in the virtual cockpit 302 is legible while the user 102 is focusing on the virtual cockpit 302 and moving their head.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
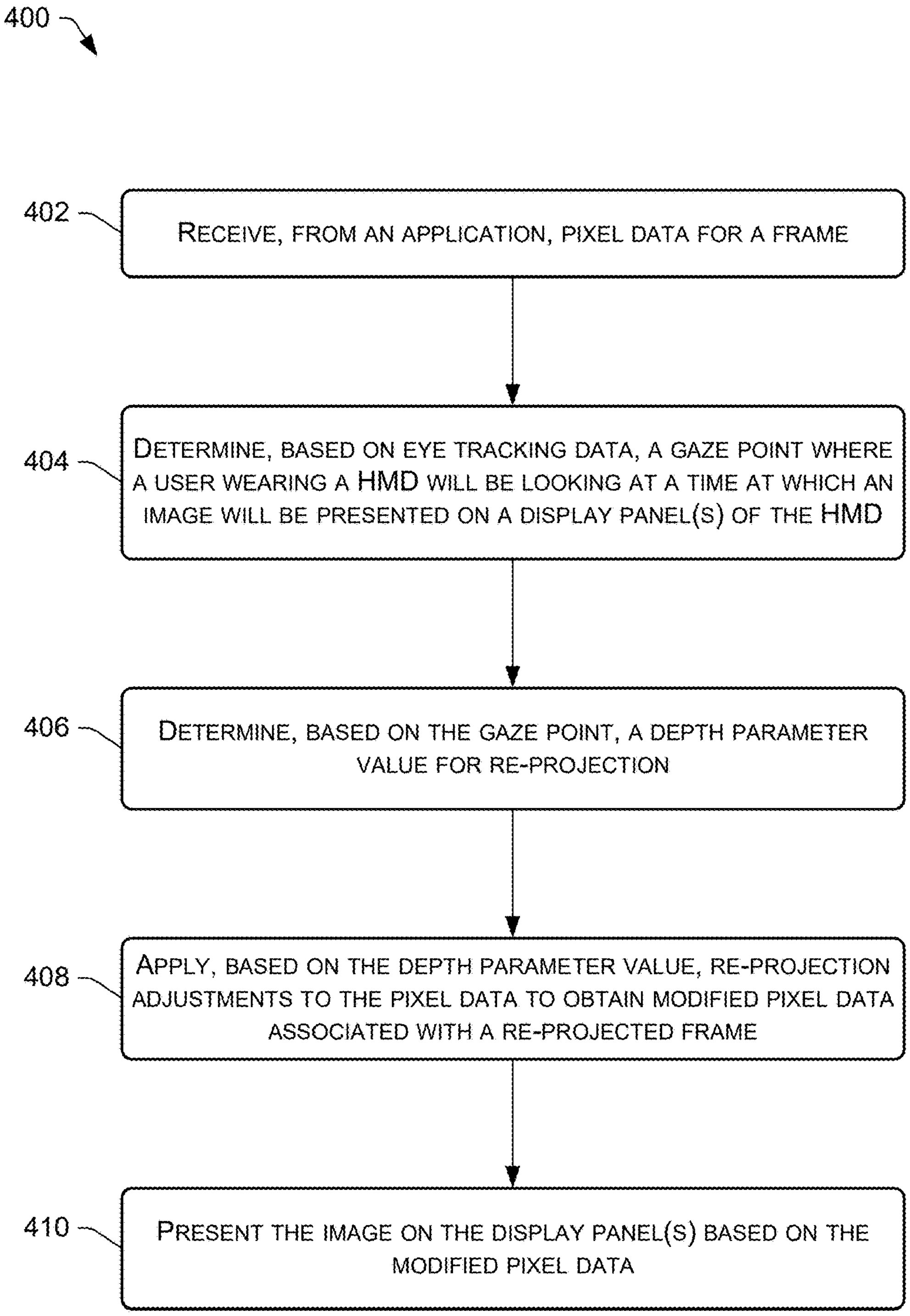
FIG. 4 is a flow diagram of an example process for implementing gaze dependent depth reprojection, in accordance with embodiments disclosed herein.

FIG. 4 illustrates a flow diagram of an example process 400 for implementing gaze dependent depth reprojection, in accordance with embodiments disclosed herein. For discussion purposes, the process 400 is described with reference to the previous figures.

At 402, pixel data for a frame 106 is received from an application 104. In some examples, the application 104 is executing on a HMD 100 or on a separate computer that is part of a system including the HMD 100. In some examples, the application 104 is a graphics-based application, such as a video game. In some examples, the application is a VR video game. In some examples, the HMD 100 may be worn by a user 102 (e.g., for purposes of immersing the user 102 in a VR environment). One or more display panels of the HMD 100 may present images based on a series of frames 106 that are output by the application 104 (e.g., a VR video game), and these images are viewed by the user 102 through the optics that are included in the HMD 100. In an example, the application 104 may generate pixel data for the series of frames 106, and the pixel data can be used to present corresponding images on the display panel(s) of the HMD 100. Accordingly, the pixel data received at 402 may be for a frame 106 of the series of frames 106.

At 404, a gaze point 116 is determined based at least in part on eye tracking data generated by an eye tracking system. The gaze point 116 determined at 404 may indicate where the user 102 wearing the HMD 100 will be looking at a time at which an image will be presented on a display panel(s) of the HMD 100 based at least in part on the pixel data received at 402. In some examples, the eye tracking system includes one or more cameras disposed in a housing of the HMD 100 and facing the eyes 114 of the user 102. The camera(s) may be configured to capture image data associated with the user's eyes 114, and the captured image data can be used to determine, among other things, a gaze point 116 in 3D space (e.g., a specific point in 3D space where the user's eyes 114 are focused). The depth of the gaze point 116 in 3D space can be calculated using any suitable algorithm, such as a binocular visual depth detection algorithm. In one example, infrared light is emitted within the HMD 100 and reflected from each eye 114. The reflected light is received or detected by a camera(s) and/or a light detector(s) (e.g., silicon photodiode(s)) of the HMD 100 and analyzed to extract eye rotation from changes in the infrared light reflected by each eye 114, which, in turn, is used to determine the gaze point 116 at 404.

At 406, a depth parameter value for reprojection is determined based at least in part on the gaze point 116. In some examples, the depth parameter value is within a range of 0 to 1. In some examples, a depth parameter value of 0 corresponds to the near plane 202(1) in 3D space and a depth parameter value of 1 corresponds to the far plane 202(2) in 3D space, where "near" and "far" are relative to the user's eyes 114. In some examples, the near plane 202(1) represents a minimum reprojection depth (e.g., 1 cm) from the user's eye 114, and the far plane 202(2) represents a maximum reprojection depth (e.g., 1000 meters) from the user's eye 114. Accordingly, determining the depth parameter value at 406 may involve translating the gaze point 116 to a corresponding depth within the range of 0 to 1. For instance, if the gaze point 116 indicates that the user 102 is focusing their gaze at a depth of about 500 meters in the 3D virtual scene relative to the user's eyes 114, and if the depth parameter value range of 0 to 1 corresponds to a range of 1 cm to 1000 meters, the depth parameter value determined at 406 may be a depth parameter value of around 0.5. As another example, if the gaze point 116 indicates that the user 102 is focusing their gaze at a depth of 1000 meters in the 3D virtual scene, and if the depth parameter value range of 0 to 1 corresponds to a range of 1 cm to 1000 meters, the depth parameter value determined at 406 may be a depth parameter value of 1. As another example, if the gaze point 116 indicates that the user 102 is focusing their gaze at a depth of 1 cm in the 3D virtual scene, and if the depth parameter value range of 0 to 1 corresponds to a range of 1 cm to 1000 meters, the depth parameter value determined at 406 may be a depth parameter value of 0. Depth parameter values in between these limits can be interpolated, in some examples.

At 408, reprojection adjustments are applied to the pixel data based at least in part on the depth parameter value to obtain modified pixel data associated with a reprojected frame. In some examples, applying the reprojection adjustments at 408 involves transforming (e.g., through rotation and/or translation calculations) the pixel data in a way that accounts for an updated pose prediction of the HMD 100, as compared to the pose of the HMD 100 used by the application 104 to render the frame 106. In some examples, applying the reprojection adjustments at 408 involves multiplying matrices, such as multiplying a projection matrix representing the pixel data by a rotation and/or translation matrix that accounts for an updated pose prediction of the HMD 100.

At 410, the image is presented on the display panel(s) of the HMD 100 based at least in part on the modified pixel data. In some examples, presenting the image on the display panel(s) of the HMD 100 at 410 includes outputting the modified pixel data for the reprojected frame to a framebuffer (e.g., a stereo framebuffer) for presenting the image (corresponding to the reprojected frame) on the display panel(s) of the HMD 100. In some examples, presenting the image on the display panel(s) of the HMD 100 at 410 includes scanning out the pixel data for the reprojected frame to the display panel(s) of the HMD 100 via a display port (e.g., a HDMI) and illuminating the light emitting elements of the display panel(s) of the HMD 100 to cause the pixels to illuminate for presenting the image.

Figure 5:
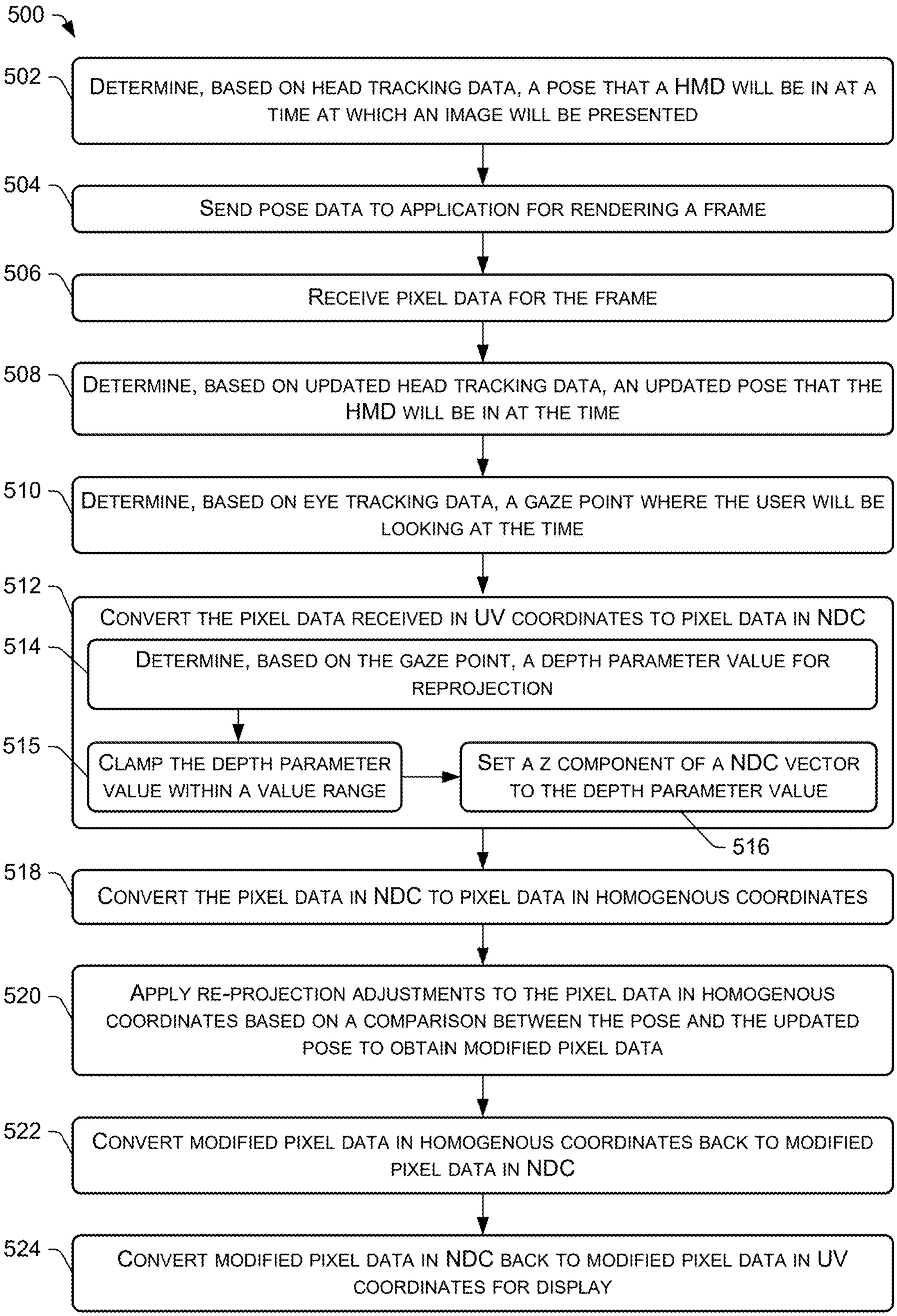
FIG. 5 is a flow diagram of another example process for implementing gaze dependent depth reprojection, in accordance with embodiments disclosed herein.

FIG. 5 is a flow diagram of another example process 500 for implementing gaze dependent depth reprojection, in accordance with embodiments disclosed herein. For discussion purposes, the process 500 is described with reference to the previous figures.

At 502, a pose that the HMD 100 will be in at a time at which an image will be presented on a display panel(s) of the HMD 100 based at least in part on pixel data that is to be received from an application 104 is determined. This original prediction of the pose of the HMD 100 at 502 may be based at least in part on head tracking data generated by the head tracking system of the HMD 100 (or HMD system).

At 504, pose data indicative of the pose determined (e.g., predicted) at 502 is sent to the application 104 for purposes of rendering a frame 106. In a distributed system, a compositor 112 of the HMD 100 may send the pose data to a separate computer (e.g., a host computer) on which the application 104 is executing. In a standalone HMD 100, the pose data may be sent (e.g., provided) to the application 104 that is executing on the HMD 100 itself.

At 506, pixel data for the frame 106 is received from the application 104. In some examples, the pixel data received at 506 is received from the application 104 in UV coordinates. UV coordinates can be used in 2D texture mapping or screen space (sometimes referred to as "display space"), and the UV coordinates represent positions on a 2D plane. Accordingly, UV coordinates may start at 0,0 in the upper left corner of a texture, and end at 1,1 in the lower right corner of the texture. In UV coordinates, u may be the horizontal coordinate (e.g., ranging from 0 to 1), and v may be the vertical coordinate (e.g., ranging from 0 to 1).

At 508, a pose (e.g., an updated pose) that the HMD 100 will be in at the time at which the image will be presented on the display panel(s) of the HMD 100 based at least in part on the pixel data received from the application 104 is determined. This updated prediction of the pose of the HMD 100 at 508 may be based at least in part on (second) head tracking data generated by the head tracking system of the HMD 100 (or HMD system). Notably, the pose is determined at 508 after the pose data is sent to the application 104 at 504, and, in some examples, the pose is determined at 508 after the pixel data is received from the application 104 at 506. This can be contrasted with the pose determined earlier at 502 and before the pose data is sent to the application 104. Because the determination at 508 is closer in time to the time of image presentation for the frame 106 (as compared to the time at which the original pose was determined at 502), the pose prediction at 508 is more accurate (e.g., has less error) than the pose prediction that was made at 502, which was further ahead of the time of image presentation.

At 510, a gaze point 116 is determined based at least in part on eye tracking data generated by an eye tracking system of the HMD 100 (or HMD system). The gaze point 116 determined at 510 may indicate where the user 102 wearing the HMD 100 will be looking at the time at which the image will be presented on the display panel(s) of the HMD 100 based at least in part on the pixel data received from the application 104. In some examples, the gaze point 116 (like the updated pose) is determined at 510 after the pose data is sent to the application 104 at 504, and, in some examples, the gaze point 116 is determined at 510 after the pixel data is received from the application 104 at 506. In some examples, the eye tracking system includes one or more cameras or other optical sensors disposed in a housing of the HMD 100 and facing the eyes 114 of the user 102. The camera(s) may be configured to capture image data of the user's eyes 114, and the captured image data can be used to determine, among other things, a gaze point 116 in 31) space (e.g., a specific point in 3D space where the user's eyes 114 are focused). The depth of the gaze point 116 in 3D space can be calculated using any suitable algorithm, such as a binocular visual depth detection algorithm. In one example, infrared light is emitted within the HID 100 and reflected from each eye 114. The reflected light is received or detected by a camera(s) and/or a light detector(s) (e.g., silicon photodiode(s)) of the HMD 100 and analyzed to extract eye rotation from changes in the infrared light reflected by each eye 114, which, in turn, is used to determine the gaze point 116 at 510.

At 512, the pixel data in the UV coordinates is converted to the pixel data in NDC. NDC may start at −1,+1 (upper left) and end at +1,−1 (lower right). NDC may be used to define a point location (x, y, and z normalized device coordinates) for each pixel within the truncated pyramid 200 depicted in FIG. 2. As shown by sub-blocks 514, 515, and 516, the conversion of the pixel data in the UV coordinates to the pixel data in the NDC may include multiple sub-operations.

At sub-block 514, a depth parameter value for reprojection is determined based at least in part on the gaze point 116 determined at 510. In some examples, the depth parameter value is within a range of 0 to 1. In some examples, a depth parameter value of 0 corresponds to the near plane 202(1) in 3D space and a depth parameter value of 1 corresponds to the far plane 202(2) in 3D space, where "near" and "far" are relative to the user's eyes 114. In some examples, the near plane 202(1) represents a minimum reprojection depth (e.g., 1 cm) from the user's eye 114, and the far plane 202(2) represents a maximum reprojection depth (e.g., 1000 meters) from the user's eye 114. Accordingly, determining the depth parameter value at 514 may involve translating the gaze point 116 to a corresponding depth within the range of 0 to 1, as described in the examples above.

At sub-block 515, in some examples, the depth parameter value is clamped (e.g., using a clamp function) within a particular value range. The value range may be the range of 0 to 1 described above at sub-block 514, or the value range may be a different value range (e.g., a range of 0.1 to 1, a range of 0.2 to 1, a range of 0.3 to 1, etc.). Clamping the depth parameter value within the value range at 515 may be beneficial in scenarios where the application 104 has not rendered a frame 106 for an above-threshold amount of time (e.g., a few seconds) and the user 102 suddenly moves (e.g., rotates and/or translates) their head by an above-threshold amount of movement (e.g., rotation and/or translation) that results in a gaze point 116 that corresponds to a negative depth in the virtual scene. With reference again to the truncated pyramid 200 depicted in FIG. 2, since the projection matrices converge to a point that corresponds to the location (x, y, z point location) of the user's eye 114, the boundary lines of the truncated pyramid 200 cross behind the eye 114 to create another pyramid behind the eye 114 for negative depth. Accordingly, if the most recently rendered frame 106 was reprojected at a positive depth within the truncated pyramid 200 depicted in FIG. 2, and if the gaze point 116 indicates that the user 102 is now looking at a negative depth (e.g., if the user 102 turned their head 180 degrees to look behind them before the application 104 renders a new frame 106), this would correspond to a negative depth that, without the clamping at 515, may cause unwanted visual artifacts, such as the virtual scene looking as if it has turned "inside out." By clamping the depth parameter value to a particular value range, if the gaze point 116 corresponds to a depth (e.g., a negative depth) outside of that particular value range, the depth parameter value is clamped to mitigate unwanted visual artifacts in scenarios where the application 104 is failing to hit frame rate for seconds at a time.

At sub-block 516, a z component of a normalized device coordinate vector is set to the depth parameter value (e.g., the clamped depth parameter value). Said another way, a normalized device coordinate (of the NDC) is set to the depth parameter value, wherein the normalized device coordinate represents depth in 3D space. Line of code (1), shown below, is an example of converting the pixel data in UV coordinates to pixel data in NDC (block 512) and setting a z component of a NDC vector to a depth parameter value of 0.6:

$$\text{float4 } ndc = \text{float4}(u*21,\ 12*v,\ 0.6,\ 1); \qquad (1)$$

In Line of code (1), float4 is a data type that represents a vector with four components, x, y, z, and w. In Line of code (1), ndc is a vector with four components that store the reprojected coordinates in NDC space, and u and v are the input UV coordinates, where u is the horizontal coordinate and v is the vertical coordinate. In Line of code (1), the expression "u*2-1" converts the u coordinate from the range [0, 1] to the range [−1, 1], and the expression "1-2*v" converts the v coordinate from the range [0, 1] to [1, −1].

In Line of code (1), 0.6 is the depth parameter value to which the z component of the normalized device coordinate vector was set at 516 of the process 500. In this example, the depth parameter value of 0.6 was determined (dynamically) based on the gaze point 116 at 514 of the process 500. In Line of code (1), the last 1 is a constant value for the w component of the NDC vector.

At 518, the pixel data in the NDC is converted to the pixel data in homogenous coordinates. Lines of code (2), shown below, is an example of converting the pixel data in NDC to pixel data in homogenous coordinates (block 518):

$$\text{float4 eye} = mul(\text{inverse}(displayProjection),\ ndc); \qquad (2)$$

$$\text{eye}/ = \text{eye} \cdot w;$$

In Lines of code (2), displayProjection is a 4×4 projection matrix, and "eye/=eye.w;" is used for normalizing after the conversion of the pixel data to homogenous coordinates.

At 520, reprojection adjustments are applied to the pixel data in the homogenous coordinates to obtain modified pixel data in the homogenous coordinates. In some examples, applying the reprojection adjustments at 520 is based on a comparison between the (updated) pose of the HMD 100 determined at 508 and the (original) pose of the HMD 100 determined at 502 (prior to receiving the pixel data from the application 104 at 506). For example, applying the reprojection adjustments at 520 may involve transforming (e.g., through rotation and/or translation calculations) the pixel data (in the homogenous coordinates) in a way that accounts for an updated pose prediction of the HMD 100, as compared to the pose of the HMD 100 used by the application 104 to render the frame 106. In examples where the application 104 is failing to hit frame rate, the reprojection adjustments applied at 520 may be based on a comparison between the (updated) pose of the HMD 100 determined at 508 and the pose of the HMD 100 determined at 502 for a previously rendered frame 106.

In any case, since the pixel data was converted from the NDC to the homogenous coordinates at 518, and because the z component of the normalized device coordinate vector is set to the depth parameter value at 516 as part of the conversion of the pixel data to the NDC at 512, applying the reprojection adjustments to the pixel data in the homogenous coordinates at 520 is based at least in part on the depth parameter value. Said another way, applying the reprojection adjustments at 520 is based at least in part on the z component set to the depth parameter value. In other words, the reprojection performed at 520 accounts for the dynamically determined depth of reprojection because the depth parameter value is "baked into" the pixel data in the homogenous coordinates, and, therefore, reprojection is performed at a depth that is dynamically determined based on the gaze point 116 determined at 510. It can also be said that applying the reprojection adjustments at 520 based at least in part on the depth parameter value includes applying the reprojection adjustments to the pixel data in the homogenous coordinates to obtain modified pixel data in the homogenous coordinates. In some examples, applying the reprojection adjustments at 520 involves multiplying matrices, such as multiplying a projection matrix representing the pixel data by a rotation and/or translation matrix that accounts for an updated pose prediction of the HMD 100. Lines of code (3), shown below, is an example of applying reprojection adjustments to the pixel data in the homogenous coordinates (block 520):

$$\text{eye} = mul(\text{inverse}(displayPose),\ \text{eye});$$

$$\text{eye} = mul(appPose,\ \text{eye});$$

In Lines of code (3), displayPose and appPose are 4×4 matrices, although 3×3 rotation matrices can be implemented in the alternative. 4×4 matrices (e.g., with a translation component included) account for translation of the user's eyes 114 that occurs as the user's head moves (sometimes referred to as "stereo reprojection").

At 522, the modified pixel data in the homogenous coordinates is converted to the modified pixel data in the NDC. Lines of code (4), shown below, is an example of converting the modified pixel data in homogenous coordinates back to the modified pixel data in the NDC (block 522):

$$ndc = mul(appProjection,\ \text{eye}); \qquad (4)$$

$$ndc/ = ndc \cdot w;$$

In Lines of code (4), appProjection is a 4×4 projection matrix, and "ndc/=ndc.w;" is used for normalizing after the conversion to NDC.

At 524, the modified pixel data in the NDC is converted to the modified pixel data in the UV coordinates for display. Line of code (5), shown below, is an example of converting the modified pixel data in the NDC back to the modified pixel data in the UV coordinates (block 524):

$$\text{return float2}(ndc.x*0.5+0.5,\ 0.5-0.5*ndc\cdot y); \qquad (5)$$

Accordingly, presenting the image (for the reprojected frame) on the display panel(s) of the HMD 100 is based at least in part on the modified pixel data in the UV coordinates.

Figure 6:
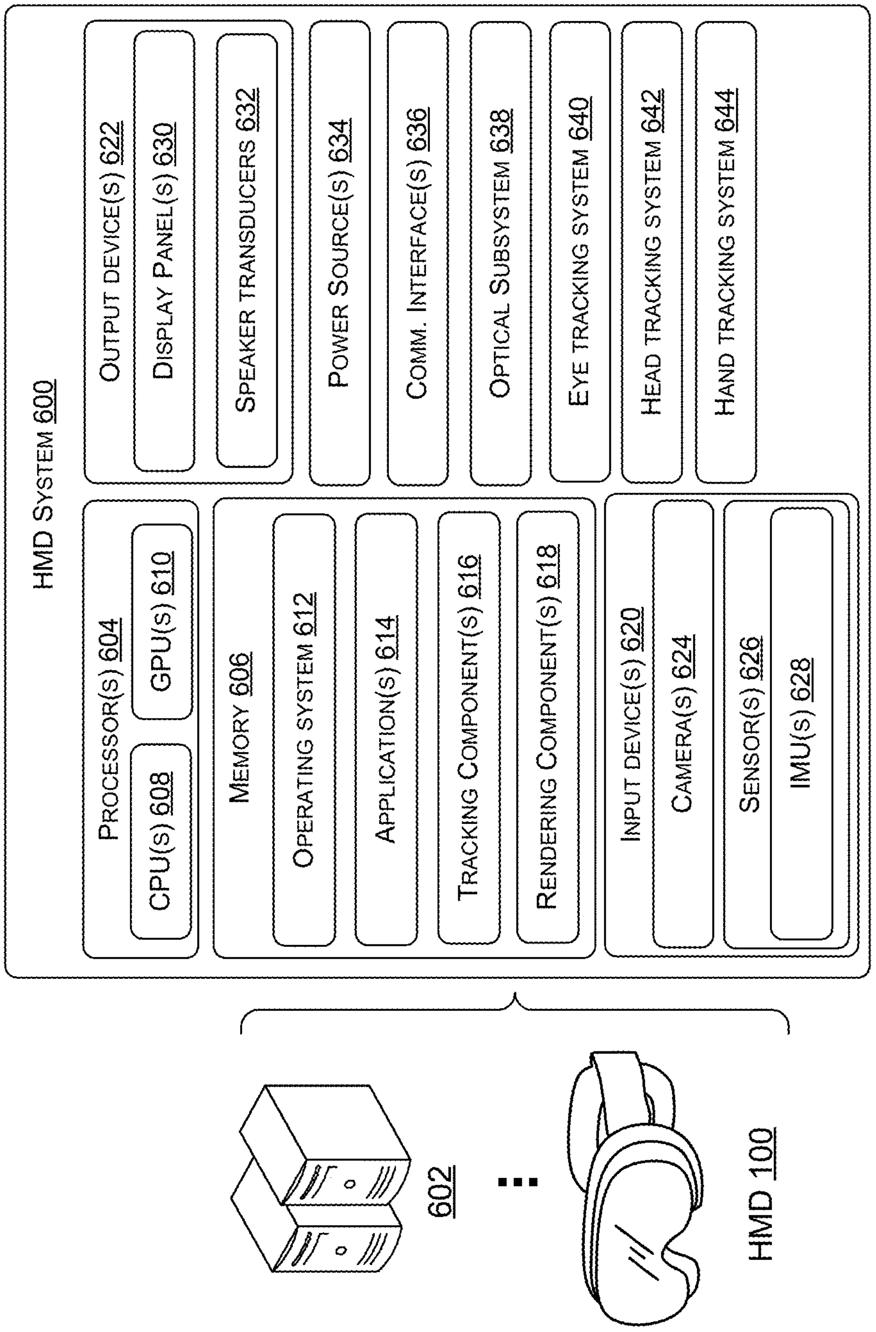
FIG. 6 illustrates example components of a HMD system in which the embodiments disclosed herein can be implemented, in accordance with embodiments disclosed herein.

FIG. 6 illustrates example components of a HMD system 600 in which the techniques disclosed herein can be implemented, in accordance with embodiments disclosed herein. As mentioned above, the HMD 100 can be part of a distributed system including the HMD 100 and one or more additional computers 602 that is/are communicatively coupled to the HMD 100. In FIG. 6, the additional computer(s) 602 may represent a host computer collocated in the same environment as the HMD 100 during use of the HMD 100 and/or a remote system that is located at a geographically remote location with respect to the HMD 100 and communicatively coupled to the HMD 100 over a wide-area network (e.g., the Internet). Alternatively, the HMD system 600 can represent a standalone HMD 100.

The HMD 100 may be implemented as a device that is to be worn by a user 102 (e.g., on a head of the user 102). In some embodiments, the HMD 100 may be head-mountable, such as by allowing a user 102 to secure the HMD 100 on his/her head using a securing mechanism (e.g., an adjustable band) that is sized to fit around a head of a user 102. In some embodiments, the HMD 100 is a VR, AR, or MR headset that includes a near-eye or near-to-eye display(s). As such, the terms "wearable device", "wearable electronic device", "headset", "VR headset", "AR headset", "MR headset", and "head-mounted display (HMD)" may be used interchangeably herein to refer to the device 100. However, it is to be appreciated that these types of devices are merely examples of a HMD 100, and it is to be appreciated that the HMD 100 may be implemented in a variety of other form factors.

In the illustrated implementation, the HMD system 600 includes one or more processors 604 and memory 606 (e.g., computer-readable media 606). In some implementations, the processors(s) 604 may include a CPU(s) 608, a GPU(s) 610, both a CPU(s) 608 and a GPU(s) 610, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 604 may possess its own local memory, which also may store program modules, program data, and/or one or more operating systems.

The memory 606 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device. The memory 606 may be implemented as computer-readable storage media ("CRSM"), which may be any available physical media accessible by the processor(s) 604 to execute instructions stored on the memory 606. In one basic implementation, CRSM may include RAM and Flash memory. In other implementations, CRSM may include, but is not limited to, ROM, EEPROM, or any other non-transitory and/or tangible medium which can be used to store the desired information, and which can be accessed by the processor(s) 604.

In general, the HMD system 600 may include logic (e.g., software, hardware, and/or firmware, etc.) that is configured to implement the techniques, functionality, and/or operations described herein. The computer-readable media 606 is shown as including various modules, such as instruction, datastores, and so forth, which may be configured to execute on the processor(s) 604 for carrying out the techniques, functionality, and/or operations described herein. A few example functional modules are shown as stored in the computer-readable media 606 and executable on the processor(s) 604, although the same functionality may alternatively be implemented in hardware, firmware, or as a system on a chip (SOC), and/or other logic.

An operating system module 612 may be configured to manage hardware within and coupled to the HMD 100 and/or the HMD system 600 for the benefit of other modules. In addition, in some instances the HMD system 600 may include one or more applications 614 stored in the memory 606 or otherwise accessible to the HMD system 600. In this implementation, the application(s) 614 includes a gaming application (e.g., a video game application). However, the HMD system 600 may include any number or type of applications and is not limited to the specific example shown here. A tracking component(s) 616 may be configured to perform tracking operations described herein, such as eye tracking, head tracking, and/or hand tracking. Head tracking (e.g., tracking the poses of the HMD 100 over time) was described above, and is described in more detail below, as is eye tracking and hand tracking. A rendering component(s) 618 may be configured to render content (e.g., video content, audio content, etc.) via the HMD 100 in a manner that is consistent with the pose of the HMD 100 at a time when the user 102 perceives the rendered content. The rendering component(s) 618 may be the same as, or similar to, the compositor 112 described above. Accordingly, the rendering component(s) 618 may be configured to implement the gaze dependent depth reprojection techniques described herein. For example, the processor(s) 604 may be configured to execute the rendering component(s) 618 to perform the process 400 and/or the process 500 described in detail above.

Generally, the HMD system 600 has input devices 620 and output devices 622. The input devices 620 may include control buttons. In some implementations, one or more microphones may function as input devices 620 to receive audio input, such as user voice input. As shown in the example of FIG. 6, in some implementations, one or more cameras 624 or other types of sensors 626, such as an inertial measurement unit (IMU) 628, may function as input devices 620. For example, the IMU 628 may be configured to detect head motion of the user 102, including for gestural input purposes. The sensors 626 (e.g., the IMU(s) 628) may further include sensors used to generate motion, position, and/or orientation data, such as gyroscopes, accelerometers, magnetometers, color sensors, or other motion, position, and orientation sensors. The sensors 626 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The sensors 626 may include light sensors that are sensitive to light (e.g., infrared or visible light) that is projected or broadcast by base stations in the environment of the HMD 100. IMU 628 may be an electronic device that generates data based on electrical signals received from accelerometers, gyroscopes, magnetometers, and/or other sensors suitable for detecting motion, correcting error associated with IMU 628, or some combination thereof. Based on the measurement signals such motion-based sensors, such as the IMU 628, may generate data indicating an estimated position, orientation, and/or pose of HMD 100 relative to an initial position, orientation, and/or pose of HMD 100. For example, multiple accelerometers may measure translational motion (forward/back, up/down, left/right) and multiple gyroscopes may measure rotational motion (e.g., pitch, yaw, and roll). IMU 628 can, for example, rapidly sample the measurement signals and calculate the estimated position, orientation, and/or pose of HMD 100 from the sampled data. For example, IMU 628 may integrate measurement signals received from the accelerometers over time to estimate a velocity vector and integrates the velocity vector over time to determine an estimated position of a reference point on HMD 100. The reference point is a point that may be used to describe the position of the HMD 100. While the reference point may generally be defined as a point in space, in various embodiments, reference point is defined as a point within the HMD 100 (e.g., a center of the IMU 628). Alternatively, IMU 628 provides the sampled measurement signals to an external console (or other computing device), which determines the data.

The sensors 626 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds. As mentioned, in some embodiments, the sensors 626 may include light sensors that are sensitive to light emitted by base stations in the environment of the HMD 100 for purposes of tracking position and/or pose, etc., of the HMD 100 in 3D space. The calculation of position and/or pose may be based on timing characteristics of light pulses and the presence or absence of light detected by the sensors 626.

In some embodiments, additional input devices 620 may be provided in the form of a keyboard, keypad, mouse, touch screen, joystick, and the like. In other embodiments, the HMD system 600 may omit a keyboard, keypad, or other similar forms of mechanical input. In some examples, the input device(s) 620 may include control mechanisms, such as basic volume control button(s) for increasing/decreasing volume, as well as power and reset buttons.

The output devices 622 may include a display(s) or display panels 630, (e.g., a stereo pair of display panels). The display panel(s) 630 of the HMD system 600 may utilize any suitable type of display technology, such as an emissive display that utilizes light emitting elements (e.g., light emitting diodes (LEDs)) to emit light during presentation of frames on the display panel(s) 630. As an example, display panel(s) 630 of the HMD system 600 may include liquid crystal displays (LCDs), organic light emitting diode (OLED) displays, inorganic light emitting diode (ILED) displays, or any other suitable type of display technology for HMD applications. The output devices 622 may further include, without limitation, a light element (e.g., LED), a vibrator to create haptic sensations, as well as speakers 632. In some examples, the speakers 632 include speaker transducers that are embedded/mounted in or on the housing of the HMD 100.

The HMD system 600 (e.g., the HMD 100) may include a power source(s) 634, such as one or more batteries. Additionally, or alternatively, the HMD 100 may include a power cable port to connect to an external power source via wired means, such as a cable.

The HMD system 600 (e.g., the HMD 100) may further include a communications interface(s) 636, such as a wireless unit coupled to an antenna(s) to facilitate a wireless connection to a network. Such a wireless unit may implement one or more of various wireless technologies, such as Wi-Fi, Bluetooth, radio frequency (RF), and so on. It is to be appreciated that the HMD 100 may further include physical ports to facilitate a wired connection to a network, a connected peripheral device (including the compute(s) 602, such as a host computer, which may be a PC, a game console, etc.), or a plug-in network device that communicates with other wireless networks.

The HMD 100 may further include optical subsystem 638 that directs light from the electronic display panel(s) 630 to a user's eye(s) using one or more optical elements. The optical subsystem 638 may include various types and combinations of different optical elements, including, without limitation, apertures, lenses (e.g., Fresnel lenses, convex lenses, concave lenses, etc.), filters, and so forth. In some embodiments, one or more optical elements in optical subsystem 638 may have one or more coatings, such as anti-reflective coatings. Magnification of the image light by optical subsystem 638 allows electronic display panel(s) 630 to be physically smaller, weigh less, and consume less power than larger displays. Additionally, magnification of the image light may increase a FOV of the displayed content (e.g., images). For example, the FOV of the displayed content is such that the displayed content is presented using almost all (e.g., 120-150 degrees diagonal), and in some cases all, of the user's FOV. AR and/or MR applications may have a narrower FOV (e.g., about 40 degrees FOV). Optical subsystem 638 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display panel(s) 630 for display is pre-distorted, and optical subsystem 638 corrects the distortion when it receives image light from electronic display panel(s) 630 generated based on the content.

The HMD system 600 may further include an eye tracking system 640. A camera 624 or other optical sensor inside HMD 100 may capture image information of a user's eyes 114, and eye tracking system 640 may use the captured information to determine interpupillary distance, interocular distance, a 3D position of each eye relative to HMD 100 (e.g., for distortion adjustment purposes), including a magnitude of torsion and rotation (i.e., roll, pitch, and yaw) and gaze directions for each eye. In one example, infrared light is emitted within HMD 100 and reflected from each eye. The reflected light is received or detected by a camera 624 and/or a light detector(s) (e.g., silicon photodiode(s)) of the HMD 100 and analyzed to extract eye rotation from changes in the infrared light reflected by each eye. Many methods for tracking the eyes 114 of a user 102 can be used by eye tracking system 640. Accordingly, eye tracking system 640 may track up to six degrees of freedom of each eye (i.e., 3D position, roll, pitch, and yaw) and at least a subset of the tracked quantities may be combined from two eyes 114 of a user 102 to estimate a gaze point 116 (i.e., a 3D location or position in the virtual scene where the user is looking). For example, eye tracking system 640 may integrate information from past measurements, measurements identifying a position of a user's 102 head, and 3D information describing a scene presented by electronic display panel(s) 630. Thus, information for the position and orientation of the user's eyes 114 is used to determine the gaze point 116 in a virtual scene presented by HMD 100 where the user 102 is looking. It is to be appreciated that the eye tracking system 640 can use a variety of different eye tracking technologies alone or in combination. In some examples, the eye tracking system 640 uses the devices and techniques described in U.S. Pat. No. 11,442,542, which is incorporated by reference herein in its entirety.

The HMD system 600 may further include a head tracking system 642. The head tracking system 642 may leverage one or more of the sensors 626 (e.g., the IMU(s) 628) and/or the camera(s) 624 to track head motion, including head rotation and/or translation, of the user 102, as described above. For example, the head tracking system 642 can track up to six degrees of freedom of the HMD 100 (i.e., 3D position, roll, pitch, and yaw). These calculations can be made at every frame of a series of frames so that an application 614 (e.g., a video game) can determine how to render a scene in the next frame in accordance with the head position and orientation. In some embodiments, the head tracking system 642 is configured to predict a future position and/or orientation of the HMD 100 based on current and/or past data. This is because an application 614 is asked to render a frame before the user 102 actually sees the light (and, hence, the image) on the display(s) 630. Accordingly, a next frame can be rendered based on this future prediction of head position and/or orientation that was made at an earlier point in time, such as roughly 25-30 milliseconds (ms) prior to rendering the frame. In a distributed system 600 where a separate computer 602 is communicatively (e.g., wirelessly) coupled to the HMD 100, the future prediction of the head pose may be made 30 ms or more in advance of the illumination time for the frame to account for network latency, compression operations, etc. Rotation data provided by the head tracking system 642 can be used to determine both direction of HMD 100 rotation, and amount of HMD 100 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 100.

The HMD system 600 may further include a hand tracking system 644. The hand tracking system 644 may leverage one or more of the sensors 626 and/or the camera(s) 624 to track controller motion (e.g., motion of one or more handheld controllers). For example, the hand tracking system 644 can track up to six degrees of freedom of the controllers the user 102 holds in his/her hands (i.e., 3D position, roll, pitch, and yaw). These calculations can be made at every frame of a series of frames so that an application 614 (e.g., a video game) can determine how to render virtual controllers and/or virtual hands in a scene in the next frame in accordance with the controller position(s) and orientation(s). In some embodiments, the hand tracking system 644 is configured to predict a future position and/or orientation of the controller(s) based on current and/or past data, as described above with respect to the head tracking system 642.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A head-mounted display (HMD) system comprising:
- a HMD including a display panel;
- an eye tracking system;
- a processor; and
- memory storing computer-executable instructions that, when executed by the processor, cause the HMD system to:
  - receive, from an application, pixel data for a frame;
  - determine, based at least in part on eye tracking data generated by the eye tracking system, a gaze point where a user wearing the HMD will be looking at a time at which an image will be presented on the display panel based at least in part on the pixel data;
  - determine, based at least in part on the gaze point, a depth parameter value for reprojection;
  - apply, based at least in part on the depth parameter value, reprojection adjustments to the pixel data to obtain modified pixel data associated with a reprojected frame; and
  - present the image on the display panel based at least in part on the modified pixel data.

2. The HMD system of claim 1, wherein:
- the computer-executable instructions, when executed by the processor, further cause the HMD system to set a z component of a normalized device coordinate vector to the depth parameter value; and
- applying the reprojection adjustments based at least in part on the depth parameter value comprises applying the reprojection adjustments based at least in part on the z component set to the depth parameter value.

3. The HMD system of claim 1, wherein:
- the pixel data is received from the application in UV coordinates; and
- the computer-executable instructions, when executed by the processor, further cause the HMD system to, prior to applying the reprojection adjustments:
  - convert the pixel data in the UV coordinates to the pixel data in normalized device coordinates; and
  - set a normalized device coordinate of the normalized device coordinates to the depth parameter value, the normalized device coordinate representing depth in three-dimensional (3D) space.

4. The HMD system of claim 1, wherein the depth parameter value is within a range of 0 to 1, 0 corresponding to a near plane, and 1 corresponding to a far plane.

5. The HMD system of claim 1, further comprising a head tracking system, wherein:

the computer-executable instructions, when executed by the processor, further cause the HMD system to determine, based at least in part on head tracking data generated by the head tracking system, a pose that the HMD will be in at the time; and applying the reprojection adjustments is further based on a comparison between the pose and an original pose of the HMD determined prior to receiving the pixel data from the application.

6. The HMD system of claim 5, wherein the pose and the gaze point are determined after pose data indicative of the original pose is sent to the application for rendering the frame.

7. A method comprising:

receiving, from an application, pixel data for a frame;

determining, based at least in part on eye tracking data generated by an eye tracking system, a gaze point where a user wearing a head-mounted display (HMD) will be looking at a time at which an image will be presented on a display panel of the HMD based at least in part on the pixel data;

determining, based at least in part on the gaze point, a depth parameter value for reprojection;

applying, based at least in part on the depth parameter value, reprojection adjustments to the pixel data to obtain modified pixel data associated with a reprojected frame; and presenting the image on the display panel based at least in part on the modified pixel data.

8. The method of claim 7, further comprising setting a z component of a normalized device coordinate vector to the depth parameter value, wherein the applying the reprojection adjustments based at least in part on the depth parameter value comprises applying the reprojection adjustments based at least in part on the z component set to the depth parameter value.

9. The method of claim 7, wherein the pixel data is received from the application in UV coordinates, the method further comprising:

converting the pixel data in the UV coordinates to the pixel data in normalized device coordinates; and setting a normalized device coordinate of the normalized device coordinates to the depth parameter value, the normalized device coordinate representing depth in three-dimensional (3D) space.

10. The method of claim 7, wherein the depth parameter value is within a range of 0 to 1, 0 corresponding to a near plane, and 1 corresponding to a far plane.

11. The method of claim 7, further comprising determining, based at least in part on head tracking data generated by a head tracking system, a pose that the HMD will be in at the time, wherein the applying the reprojection adjustments is further based on a comparison between the pose and an original pose of the HMD determined prior to the receiving the pixel data from the application.

12. The method of claim 11, wherein the pose and the gaze point are determined after pose data indicative of the original pose is sent to the application for rendering the frame.

13. A system comprising:

a headset including a display panel;

an eye tracking system;

a processor; and memory storing computer-executable instructions that, when executed by the processor, cause the system to:

receive, from an application, pixel data for a frame;

determine, based at least in part on eye tracking data generated by the eye tracking system, a gaze point where a user wearing the headset will be looking at a time at which an image will be presented on the display panel based at least in part on the pixel data;

determine, based at least in part on the gaze point, a depth parameter value for reprojection;

apply, based at least in part on the depth parameter value, reprojection adjustments to the pixel data to obtain modified pixel data associated with a reprojected frame; and present the image on the display panel based at least in part on the modified pixel data.

14. The system of claim 13, wherein:

the pixel data is received from the application in UV coordinates; and the computer-executable instructions, when executed by the processor, further cause the system to:

convert the pixel data in the UV coordinates to the pixel data in normalized device coordinates;

set a normalized device coordinate of the normalized device coordinates to the depth parameter value, the normalized device coordinate representing depth in three-dimensional (3D) space, convert the pixel data in the normalized device coordinates to the pixel data in homogenous coordinates, wherein applying the reprojection adjustments based at least in part on the depth parameter value comprises applying the reprojection adjustments to the pixel data in the homogenous coordinates to obtain the modified pixel data in the homogenous coordinates;

convert the modified pixel data in the homogenous coordinates to the modified pixel data in the normalized device coordinates; and convert the modified pixel data in the normalized device coordinates to the modified pixel data in the UV coordinates, wherein presenting the image on the display panel comprises presenting the image on the display panel based at least in part on the modified pixel data in the UV coordinates.

15. The system of claim 13, wherein the depth parameter value is within a range of 0 to 1, 0 corresponding to a near plane, and 1 corresponding to a far plane.

16. The system of claim 13, wherein the gaze point is determined after pose data indicative of an original pose of the headset is sent to the application for rendering the frame.

17. The system of claim 13, further comprising a head tracking system, wherein:

the computer-executable instructions, when executed by the processor, further cause the system to determine, based at least in part on head tracking data generated by the head tracking system, a pose that the headset will be in at the time; and applying the reprojection adjustments is further based on a comparison between the pose and an original pose of the headset determined prior to receiving the pixel data from the application.

18. The system of claim 17, wherein the pose and the gaze point are determined after pose data indicative of the original pose is sent to the application for rendering the frame.

19. The HMD system of claim 1, wherein the depth parameter value is determined for the reprojection to compensate for inaccuracies in an original pose prediction of the HMD or to compensate for the application failing to hit frame rate.

20. The method of claim 7, wherein the applying the reprojection adjustments based at least in part on the depth parameter value comprises multiplying a projection matrix representing the pixel data by a rotation matrix or a translation matrix that accounts for an updated pose prediction of the HMD, as compared to a pose of the HMD used by the application to render the frame.

* * * * *